United States Patent [19]

Allard

[11] 3,801,887
[45] Apr. 2, 1974

[54] BRUSHLESS VARIABLE SPEED DRIVE FOR A. C. SYNCHRONOUS MOTOR

[75] Inventor: John Joseph Allard, Mishicot, Wis.

[73] Assignee: AMF Incorporated, White Plains, N.Y.

[22] Filed: Apr. 10, 1973

[21] Appl. No.: 349,689

[52] U.S. Cl. ............... 318/138, 318/171, 318/333, 307/252 F, 331/65, 331/111, 318/341
[51] Int. Cl. ........................................ H02k 29/02
[58] Field of Search ........... 318/171, 227, 230, 231, 318/254, 138, 333, 334, 335, 329, 331, 345, 341; 328/145; 307/252 F, 301, 293; 331/65, 66, 111

[56] References Cited
UNITED STATES PATENTS

| | | | |
|---|---|---|---|
| 3,098,958 | 7/1963 | Katz | 318/171 |
| 3,473,069 | 10/1969 | Herbert | 318/138 |
| 3,489,968 | 1/1970 | Katz | 318/138 |
| 2,898,533 | 8/1959 | Beckett | 318/341 |
| 2,995,690 | 8/1961 | Lemon | 318/341 |
| 3,250,066 | 5/1966 | Engelhardt | 318/329 |
| 3,613,391 | 10/1971 | Harter | 318/345 |

Primary Examiner—Bernard A. Gilheany
Assistant Examiner—Thomas Langer
Attorney, Agent, or Firm—George W. Price; John H. Gallagher

[57] ABSTRACT

A motor speed control circuit is provided for varying the speed of a motor in response to a change in an ambient parameter. An A.C. hysteresis motor is driven from a D. C. supply by a multivibrator. The multivibrator is driven in synchronism with a unijunction relaxation oscillator which oscillates at a variable frequency determined by changes in said ambient parameter. A resistive sensor means is provided in circuit with the relaxation oscillator for detecting changes in the ambient parameter. The resistance of the sensor varies logarithmically with changes in the ambient parameter. The unijunction oscillator means is provided with means to compensate for the logarithmic change in the sensor, to thereby provide an oscillator frequency which varies linearly with said ambient parameter. Since the speed of the motor is controlled by the frequency of the oscillator, the motor speed is also a linear function of the change in the ambient parameter.

23 Claims, 1 Drawing Figure

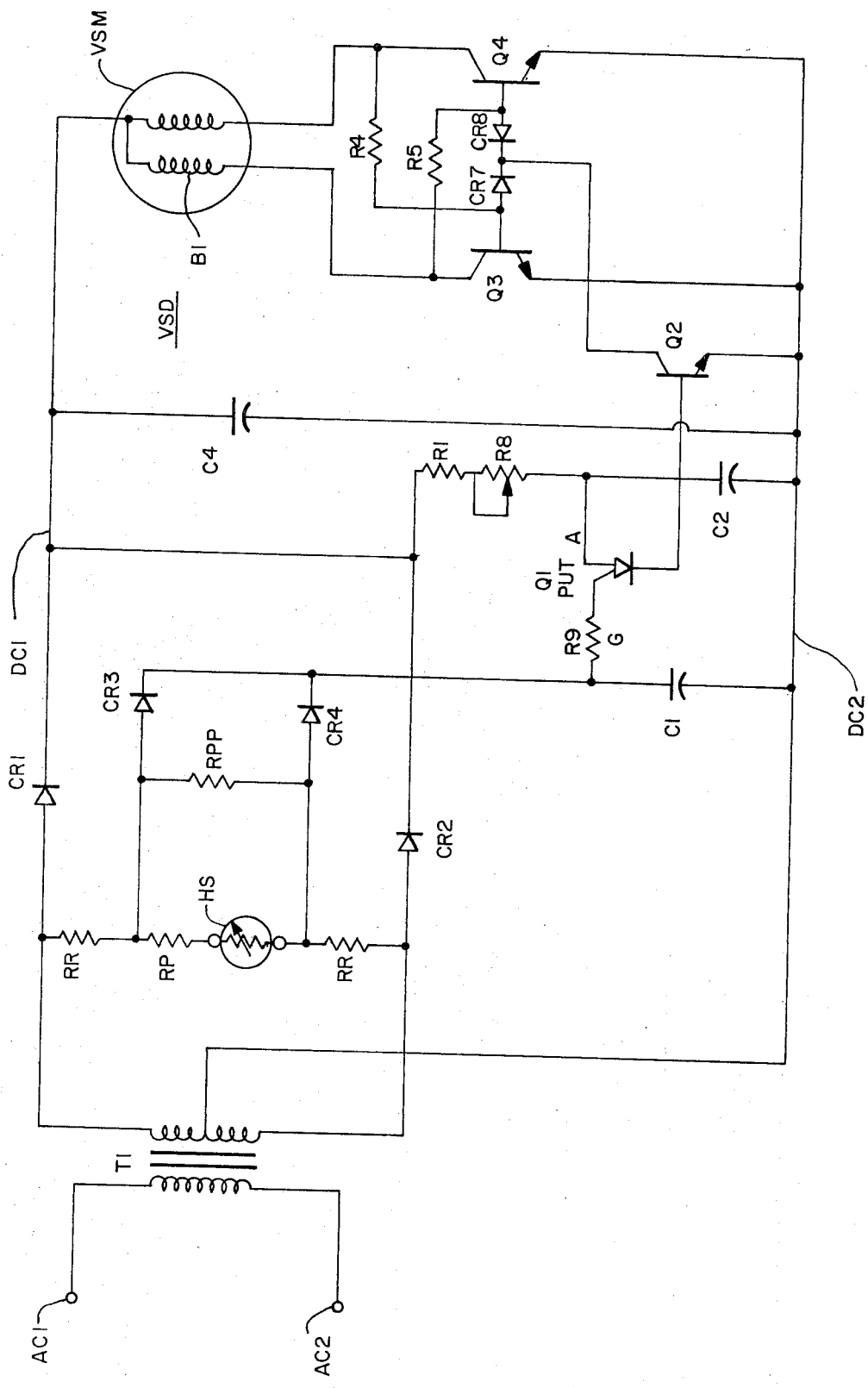

BRUSHLESS VARIABLE SPEED DRIVE FOR A. C. SYNCHRONOUS MOTOR

This invention relates to a transducer for controlling the speed of an A. C. hysteresis motor as a linear function of a change in an ambient parameter. More specifically this invention relates to a motor speed control circuit having a resistance means therein which varies logarithmically with the change in said ambient parameter and means for operating on said logarithmic change to provide a linear change in the motor speed as a function of said parameter.

Various timing devices are known for controlling the cycles of various physical or chemical processes. These timing devices generally include timing motors, of the synchronous type which are driven at predetermined substantially constant speeds. However, these predetermined speeds often become unacceptable and need modification as the ambient conditions of the processes change. Accordingly, it is often necessary to change the speed of the timing motors as a function of the changes of the ambient conditions.

It is preferred to be able to change the speed of the timing motor as a linear function of the change in the ambient condition. This is easily done if a linear resistance sensor is available. In this situation a standard oscillator can be employed whose frequency varies as a function of an RC circuit containing the linear resistance sensor. The oscillator can thereby drive the timing motor at a speed which varies linearly with the change in the sensor resistance.

However, it is quite often the case that the sensor resistance does not vary linearly with a change in the parameter sensed. The resistance of the sensor in many cases varies logarithmically with a change in the ambient parameters. Therefore, in this situation a standard type of oscillator can not be used to provide a speed change which varies as a linear function of a change in an ambient parameter.

Accordingly, it is an object of the present invention to provide a speed control circuit for a synchronous motor which varies the speed of said motor as a linear function of a sensed change in an ambient parameter.

It is another object of the present invention to provide means for varying the speed of a synchronous motor as a linear function of a change in an ambient parameter in response to a logarithmic resistance change in a sensor means for detecting said change in said ambient parameter.

It is a further object of the present invention to provide a transducer means for varying the cycle of a process or apparatus in response to a change in ambient conditions during said cycle.

The objects of the present invention are fulfilled by providing an oscillator for driving an A.C. synchronous motor at a speed determined by the frequency of said oscillator. The frequency of the oscillator is controlled by a change in an ambient parameter such as pressure, temperature, or humidity by a sensor, the resistance of which varies as a nonlinear function of the ambient parameter. The frequency of the oscillator of the present invention is also controlled by an additional exponential function which is matched with the nonlinear function to provide a linear change in frequency of the oscillator with a change in the ambient paramter. Thus the speed of the synchronous timer motor can be controlled as a linear function of a change in the ambient parameter detected.

The objects of the present invention and the attendant advantages thereof will become more fully apparent with reference to the following description of the drawing.

Referring to the drawing there is illustrated a variable speed drive circuit generally indicated VSD for a variable speed A.C. hysteresis motor VSM, which is adapted to drive a load at a predetermined speed. The load may be a timer for controlling the cycle of a process. The function of control circuit VSD is to vary the speed of motor VSM as a linear function of changes in ambient relative humidity sensed by humidity sensor HS.

A bias voltage is provided for variable speed drive VSD through A.C. supply lines AC1, AC2, and transformer T1. Transformer T1 is not essential to this circuit but it provides a voltage reduction so taht transistors Q3 and Q4 to be described more fully hereinafter can be low voltage common transistors and center tapping can be accomplished without power resistors.

Diodes CR1, CR2, CR3, CR4, and filter capacitor C4 are provided for changing A. C. to D. C. so that motor VSM is driven by a D. C. voltage. Diodes CR1 and CR2 are connected to the center tapped secondary of transformer T1.

Diodes CR3 and CR4 provide A. C. isolation for humidity sensor resistor HS because many such sensors cannot be subjected to D. C. currents without calibration damage.

Motor VSM is provided with a bifilar wound coil B1 having two parallel branches each consisting of one half the turns of coil B1 for driving motor VSM. D. C. power is supplied to coil B1 from line DC1. The parallel branches of coil B1 are connected in circuit with the collectors of transistors Q3 and Q4, respectively.

Transistors Q3 and Q4 are connected for alternate conduction in a conventional bistable multivibrator configuration wherein the collector of transistor Q3 is coupled to the base of transistor Q4 through resistor R5 and the collector of transistor Q4 is coupled to the base of transistor Q3 through resistor R4. The emitters of transistors Q3 and Q4 are coupled to a common emitter junction at line DC2.

Because of the coil inductance of B1 in the collector circuits of transistors Q3 and Q4, the multivibrator will free run as an RL multivibrator to drive motor VSM. The multivibrator can be triggered by momentarily connecting both bases of transistors Q3 and Q4 to their emitters through diodes CR7, CR8 and buffer amplifier transistor Q2. This is done in response to a trigger pulse from unijunction transistor Q1 which periodically turns transistor Q2 on in a manner to be described hereinafter.

The multivibrator circuit will free run as a function of the back EMF of the transformer action of the motor coil B1. This transformer action only permits a gradual build-up of motor coil current compared to the apparent impedance of the coil itself.

The transformer action of the coil B1 acts as a memory for the multivibrator to enable the multivibrator to recall which of the transistors Q3 and Q4 was "on" and which transistor was "off." As motor drive current flows through one branch of the coil B1 it acts as a transformer primary and the other branch as a transformer secondary. The secondary furnishes an exponential base drive current to the on transistor. During the latter part of the exponential current drive pulse, the falling value of di/dt causes the on transistor to come out of saturation and start towards cut-off. The collector current of the on transistor changes at a slower pace due to the motor inductance. The motor current is then diverted from the on transistor collector to the off transistor base, thus turning it on. This transistor is regenerative and ends with the formerly on transistor cut off and the off transistor saturated.

The multivibrator including transistors Q3 and Q4 can be driven synchronously by pulses furnished through transistor Q2 by a unijunction transistor oscillator Q1 the cathode of which is connected to the base of transistor Q2. The pulses are supplied by the unijunction at a rate which varies linearly with the changes in the ambient humidity sensed by humidity sensor HS.

In order to change the speed of motor VSM linearly with a change in humidity sensed by humidity sensor HS the present invention makes use of a curve or function matching technique, whereby more than one parameter controls the frequency of unijunction transistor oscillator Q1.

A programmable unijunction transistor Q1 is provided which will fire and turn on transistor Q2 when the anode voltage A is larger than the gate voltage G. The gate voltage G is determined by the voltage across capacitor C1 connected between a current limiting resistor R9 of gate G and line DC2. The voltage across capacitor C1 is determined from Ohms Law as a function of the sensor resistance HS and RR, RP, and RPP. The resistance of sensor HS varies logarithmically with a change in ambient relative humidity but by virtue of the resistance network the voltage coupled to the gate of Q1 is changed to a substantially exponential function. Therefore, the voltage across capacitor C1 varies nonlinearly with a change in the ambient relative humidity, as determined by these two nonlinear parameters.

An RC time-constant circuit including resistors R1, R8, and capacitor C2 provides the anode of unijunction transistor Q1 with a voltage that varies exponentially with time. Capacitor C2 is connected between anode A and line DC2 and resistors R1, R8 are connected in series between line DC1 and anode A. R8 comprises an adjustable potentiometer for selectively varying the time constant of the RC circuit.

The frequency of oscillator Q1 is determined by the relative voltages at the gate G and the anode A thereof. Since the voltage of the gate G determines the firing voltage of the anode, then the frequency of the oscillator varies exponentially with the voltage of the gate. Thus, if the voltage at the gate is made an exponential function of the ambient relative humidity, the frequency of oscillator Q1 can be made to vary linearly with a change in the ambient relative humidity. This is accomplished by the proper selection of resistors RR, RP, RPP, R1, R8, and capacitor C2.

In operation unijunction transistor Q1 fires and generates a pulse on the base of transistor Q2 to turn transistor Q2 on at a frequency which varies linearly as a function of a change in relative humidity sensed by resistor HS. When transistor Q2 turns on it momentarily connects both bases of transistors Q3 and Q4 through diodes CR7, CR8 to the emitters thereof, which drives the multivibrator into operation. The multivibrator operates alternately energize the coil branches of coil B1 to thereby drive motor VSM. The alternate conduction of transistors Q3, Q4 is synchronized with the firing of unijunction transistor Q1. Therefore, the motor VSM is driven at a speed determined by the frequency of unijunction oscillator Q1. Since the frequency of oscillator Q1 varies as a linear function of the change in relative humidity sensed, the speed of motor VSM will also vary as a linear function of the relative humidity.

Those skilled in the art will realize that the curve or function matching technique could be extended to yield a variable speed motor which varies as a nonlinear function of an input parameter which is either linear or nonlinear. This is true because the use of a programable unijunction transistor permits the matching of up to five independent functions by proper selection of components. These five functions are the input sensor selected, the output speed desired, the RC time constant, the exponential variation of this RC time constant with voltage at the PUT gate and the linear or nonlinear resistance voltage divider.

What is claimed is:

1. A transducer for driving a variable speed motor at speeds which vary as a linear function of an ambient parameter comprising:
   a. means for sensing said ambient parameter and generating a signal which varies logarithmically with said ambient parameter;
   b. oscillator means coupled to said sensing means and to circuit means for generating a signal which varies exponentially with respect to time;
   c. means for controlling the frequency of said oscillator means as a combined function of said logarithmic and exponential signals to thereby vary said frequency linearly with said ambient parameter; and
   d. synchronous motor means coupled to said oscillator means, said synchronous motor being driven at a speed determined by the frequency of said oscillator means.

2. The transducer of claim 1 wherein said ambient parameter sensed is relative humidity.

3. The transducer of claim 1 wherein there is further provided bistable multivibrator means for driving said synchronous motor, said bistable multivibrator being coupled to said oscillator means to drive said synchronous motor in synchronism with the frequency of said oscillator means.

4. The transducer of claim 1 wherein there is further provided semiconductor switch means for gating the output of said oscillator means to said bistable multivibrator.

5. A transducer for driving a variable speed motor at speeds which vary as a function of an ambient parameter comprising:
   a. synchronous motor means;
   b. bistable multivibrator means for driving said synchronous motor means;
   c. oscillator means for driving said bistable multivibrator means in synchronism with the frequency of said oscillator means, said oscillator means including semiconductor means having a gate electrode, an anode, and a cathode, said semi-conductor means being rendered conductive to generate a pulse through said cathode to said multivibrator means at a frequency determined by the relative voltage at said gate electrode and said anode;

d. means for supplying a voltage to said anode which varies exponentially with time; and e. means coupled to the gate electrode of said oscillator for sensing said ambient parameter and generating a voltage at said gate which varies as a function of said ambient parameter; whereby the combined functions of the voltages applied to said gate and anode of said oscillator means constrain the frequency of said oscillator means to vary as a function of said ambient parameter.

6. The transducer of claim 5 wherein said semiconductor means is a programmable unijunction transistor.

7. The transducer of claim 5 wherein semiconductor gate means are provided for coupling said oscillator means to said bistable multivibrator.

8. The transducer of claim 5 wherein said means for sensing said ambient parameter comprises resistive means, the resistance of which varies logarithmically with the ambient parameter.

9. The transducer of claim 8 wherein said resistive means is biased with A. C. power and said oscillator means is biased with D. C. power and means are provided for isolating the A. C. power of said resistive means and the D.C. power of said oscillator means.

10. The transducer of claim 5 wherein said ambient paramter sensed is relative humidity.

11. A transducer for varying the frequency of an oscillator as a linear function of an ambient parameter comprising:

a. means for sensing said ambient parameter and generating a signal which varies logarithmically with said ambient parameter;

b. oscillator means coupled to said sensing means and to circuit means for generating a signal which varies exponentially with respect to time;

c. means for controlling the frequency of said oscillator means as a combined function of said logarithmic and exponential signals to thereby vary said frequency linearly with said ambient parameter.

12. The transducer of claim 11 wherein said ambient parameter sensed is relative humidity.

13. The transducer of claim 11 wherein there is further provided bistable multivibrator means for driving a synchronous motor, said bistable multivibrator being coupled to said oscillator means to drive said synchronous motor in synchronism with the frequency of said oscillator means.

14. The transducer of claim 11 wherein there is further provided semiconductor switch means for gating the output of said oscillator means to said bistable multivibrator.

15. A transducer for varying the frequency of an oscillator as a function of an ambient parameter comprising:

a. oscillator means including a semiconductor means having a gate electrode, an anode, and a cathode, said semiconductor means being rendered conductive to generate output pulses at said cathode at a frequency determined by the relative voltages at said gate electrode and said anode;

b. means for supplying a voltage to said anode which varies exponentially with time; and c. means coupled to the gate electrode of said oscillator for sensing said ambient parameter and generating a voltage at said gate which varies as a function of said ambient parameter; whereby the combined functions of the voltages applied to said gate and anode of said oscillator means constrain the frequency of said oscillator means to vary as a function said ambient parameter.

16. The transducer of claim 15 wherein said semiconductor means is a programable unijunction transistor.

17. The transducer of claim 15 wherein semiconductor gate means are provided for coupling said oscillator means to said bistable multivibrator.

18. The transducer of claim 15 wherein said means for sensing said ambient parameter comprises resistive means, the resistance of which varies logarithmically with the ambient parameter.

19. The transducer of claim 18 wherein said resistive means is biased with the A. C. power and said oscillator means is biased with D. C. power and means are provided for isolating the A. C. power of said resistive means and the D. C. power of said oscillator means.

20. The transducer of claim 15 wherein said ambient parameter sensed is relative humidity.

21. The transducer of claim 5 wherein the voltage at the gate of said semiconductor means varies exponentially with said ambient parameter and the frequency of said oscillator means varies linearly with said ambient parameter.

22. The transducer of claim 15 wherein the voltage at the gate of said semiconductor means varies exponentially with said ambient parameter and the frequency of said oscillator means varies linearly with said ambient parameter.

23. A tranducer for driving a motor at speeds which vary as a linear function of an ambient parameter comprising:

a. means for sensing said ambient parameter and generating a first signal which varies as a first nonlinear function with changes in said ambient parameter;

b. oscillator means for producing an oscillating signal;

c. circuit means coupled to said oscillator for producing a second signal which varies as a second and different nonlinear function with respect to time;

d. means coupling said sensing means to said oscillator means for changing said second signal to a third nonlinear signal;

e. said second and third signals controlling said oscillator to vary the oscillator frequency as a linear function of change in said ambient parameter;

f. a synchronous motor; and g. means for coupling said oscillator signal to said motor for controlling the speed of said motor as a linear function of change in said ambient parameter.

* * * * *